United States Patent

Stillie et al.

[11] Patent Number: 6,033,125
[45] Date of Patent: Mar. 7, 2000

[54] SEALED MULTIPOSITION FIBER OPTIC CONNECTOR

[75] Inventors: Donald Gray Stillie; William Batty, both of Winston-Salem; Bobby Gene Ward, King, all of N.C.

[73] Assignee: The Whitaker Corporation, Wilmington, Del.

[21] Appl. No.: 08/852,913

[22] Filed: May 8, 1997

Related U.S. Application Data

[62] Division of application No. 08/728,505, Oct. 9, 1996, Pat. No. 5,671,311, which is a continuation of application No. 08/340,101, Nov. 15, 1994, abandoned.

[51] Int. Cl.$^7$ .................................................. G02B 6/38
[52] U.S. Cl. ........................................... 385/75; 385/101
[58] Field of Search ..................................... 385/75, 101

[56] References Cited

U.S. PATENT DOCUMENTS

| | | | |
|---|---|---|---|
| 3,951,514 | 4/1976 | Medina, Jr. ........................... | 350/96 C |
| 4,167,303 | 9/1979 | Bowen et al. ........................ | 350/96.21 |
| 4,241,967 | 12/1980 | Collins ................................. | 339/59 M |
| 4,277,135 | 7/1981 | Schratt et al. ............................ | 385/60 |
| 4,385,801 | 5/1983 | Bubanko ............................... | 350/96.21 |
| 4,415,232 | 11/1983 | Caron ................................... | 350/96.21 |
| 4,418,983 | 12/1983 | Bowen et al. ........................ | 350/96.21 |
| 4,464,817 | 8/1984 | Johnson, Jr. et al. ................. | 29/33 M |
| 4,477,146 | 10/1984 | Bowen et al. ........................ | 350/96.21 |
| 4,597,631 | 7/1986 | Flores .................................... | 350/96.2 |
| 4,653,846 | 3/1987 | Yamazaki et al. .................... | 350/96.2 |
| 4,678,270 | 7/1987 | Gunn et al. ............................ | 385/101 |
| 4,711,509 | 12/1987 | Cross et al. ............................ | 439/587 |
| 4,730,198 | 3/1988 | Brown et al. ............................ | 385/91 |
| 4,775,212 | 10/1988 | Smith ..................................... | 385/101 |
| 4,802,725 | 2/1989 | Borne et al. .......................... | 350/96.2 |

(List continued on next page.)

FOREIGN PATENT DOCUMENTS

| | | | |
|---|---|---|---|
| 484 996 B1 | 5/1992 | European Pat. Off. .......... | G02B 6/42 |
| 0 505 197 A2 | 9/1992 | European Pat. Off. .......... | G02B 6/38 |
| 2 669 155 | 5/1992 | France ............................. | H01R 23/02 |
| 2 247 574 | 3/1992 | United Kingdom ......... | H01R 13/627 |
| WO 85/04492 | 10/1985 | WIPO .............................. | G02B 6/38 |
| WO 87/03969 | 7/1987 | WIPO .............................. | G02B 6/38 |

OTHER PUBLICATIONS

*SAE Technical Paper Series, 940799,* "New Types of Connectors for Plastic Optic Fibres for Vehicle Network Applications", Gerd Schreiter, Andreas Engel, and Georghe Hotea, Feb. 28, 1994, No. of Pages, 8, International Congress & Exposition , Detroit Michigan.

*SAE Technical Paper Series, 940801,* "New Design of N*N Coupler and Connectors for Plastic Optical Fibres", Egbert T.C.M. van Woesik, Jan Post, and Harry H. Kokken, Feb. 28, 1994, No. of Pages, 9, International Congress & Exposition, Detroit Michigan.

F. P. Cefarelli and R. T. Evans, "Optical Circuit Module Connecotr", IBM Technical Disclosure Bulletin, vol. 21, No. 4, Sep. 1978.

*Primary Examiner*—Rodney Bovernick
*Assistant Examiner*—Robert E. Wise

[57] ABSTRACT

A multiposition optical connector 2 and a mating header 4 are disclosed. The connector includes a plurality of ferrules 10 for terminating individual plastic optical fiber cables 6. An alignment fixture 100 is used to precisely align each ferrule relative to the other ferrules and relative to peripheral mating surface protrusions 52 on a molded alignment plate 12. The ferrules are ultrasonically bonded to the alignment plate. True positioning for multiple fibers located in the multiposition connector relative to active optoelectronic devices 90 located in the header can be achieved when the connector and the header are mated. A previously assembled harness assembly using the optical connector 2 and a hybrid electrical and optical connector 202 is suited for use in making multiple connections to products, such as automobiles, in which the final assembly is completed in an assembly line.

5 Claims, 15 Drawing Sheets

U.S. PATENT DOCUMENTS

| | | | |
|---|---|---|---|
| 4,895,425 | 1/1990 | Iwano et al. | 385/60 |
| 4,936,791 | 6/1990 | Zielinski et al. | 439/271 |
| 4,946,402 | 8/1990 | Fink et al. | 439/274 |
| 4,950,175 | 8/1990 | Plyler et al. | 439/274 |
| 4,973,266 | 11/1990 | Bullard | 439/589 |
| 4,973,268 | 11/1990 | Smith et al. | 439/595 |
| 4,986,625 | 1/1991 | Yamada et al. | 350/96.2 |
| 5,097,523 | 3/1992 | Marie | 385/59 |
| 5,133,032 | 7/1992 | Salter et al. | 385/60 |
| 5,134,679 | 7/1992 | Robin et al. | 385/90 |
| 5,140,659 | 8/1992 | Minds et al. | 385/101 |
| 5,145,410 | 9/1992 | Maejima et al. | 439/587 |
| 5,185,837 | 2/1993 | Ayuta et al. | 385/81 |
| 5,212,753 | 5/1993 | Maranto | 385/90 |
| 5,242,315 | 9/1993 | O'Dea | 439/577 |
| 5,325,455 | 6/1994 | Henson et al. | 385/89 |
| 5,337,385 | 8/1994 | Baderschneider et al. | 385/9 |
| 5,361,318 | 11/1994 | Go et al. | 385/89 |
| 5,379,362 | 1/1995 | Kawamura | 385/92 |
| 5,404,416 | 4/1995 | Iwano et al. | 385/60 |
| 5,423,678 | 6/1995 | Schaffer et al. | 385/92 |
| 5,452,388 | 9/1995 | Rittle et al. | 385/89 |
| 5,764,043 | 6/1998 | Czosnowski et al. | 385/101 |

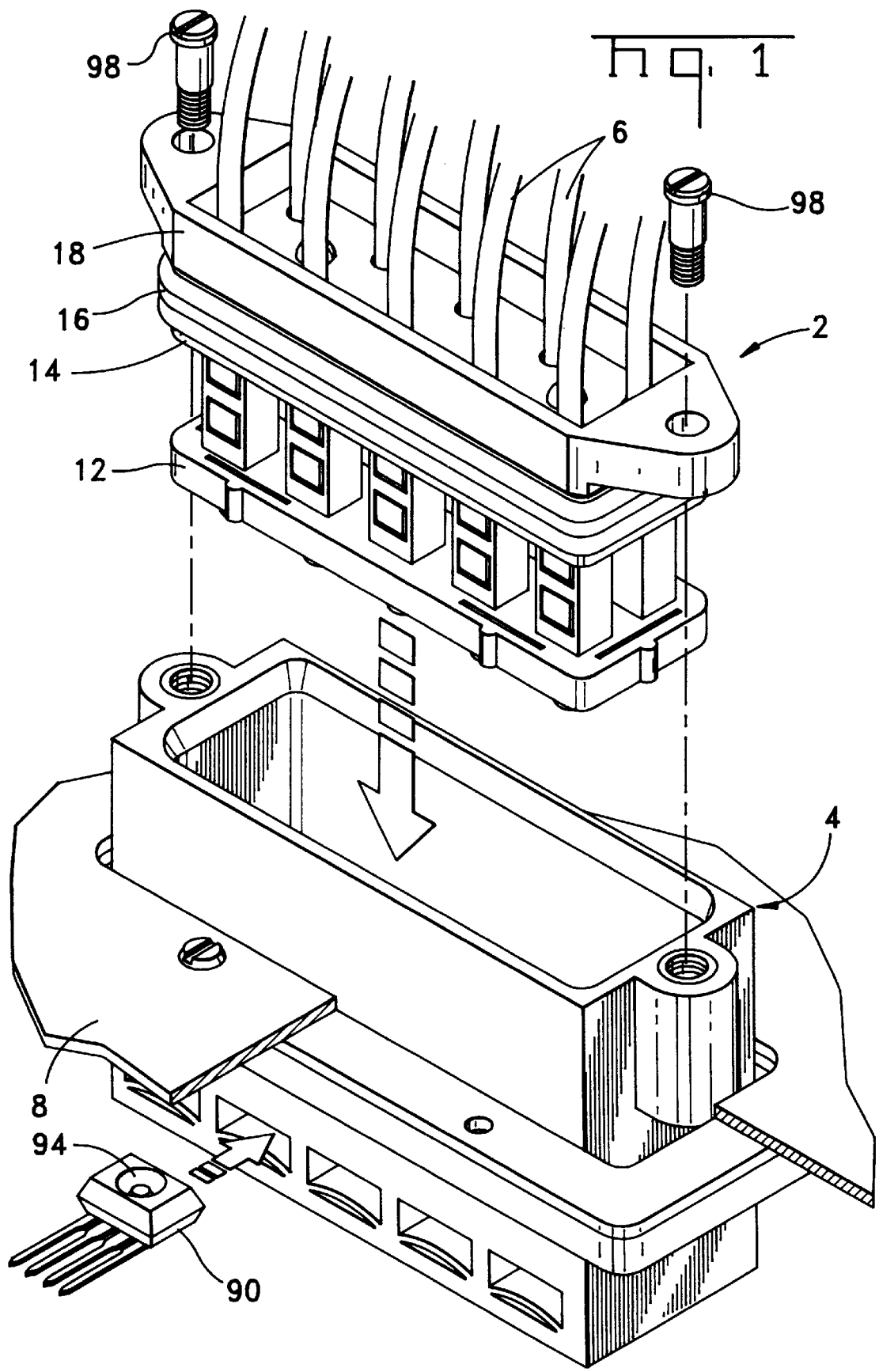

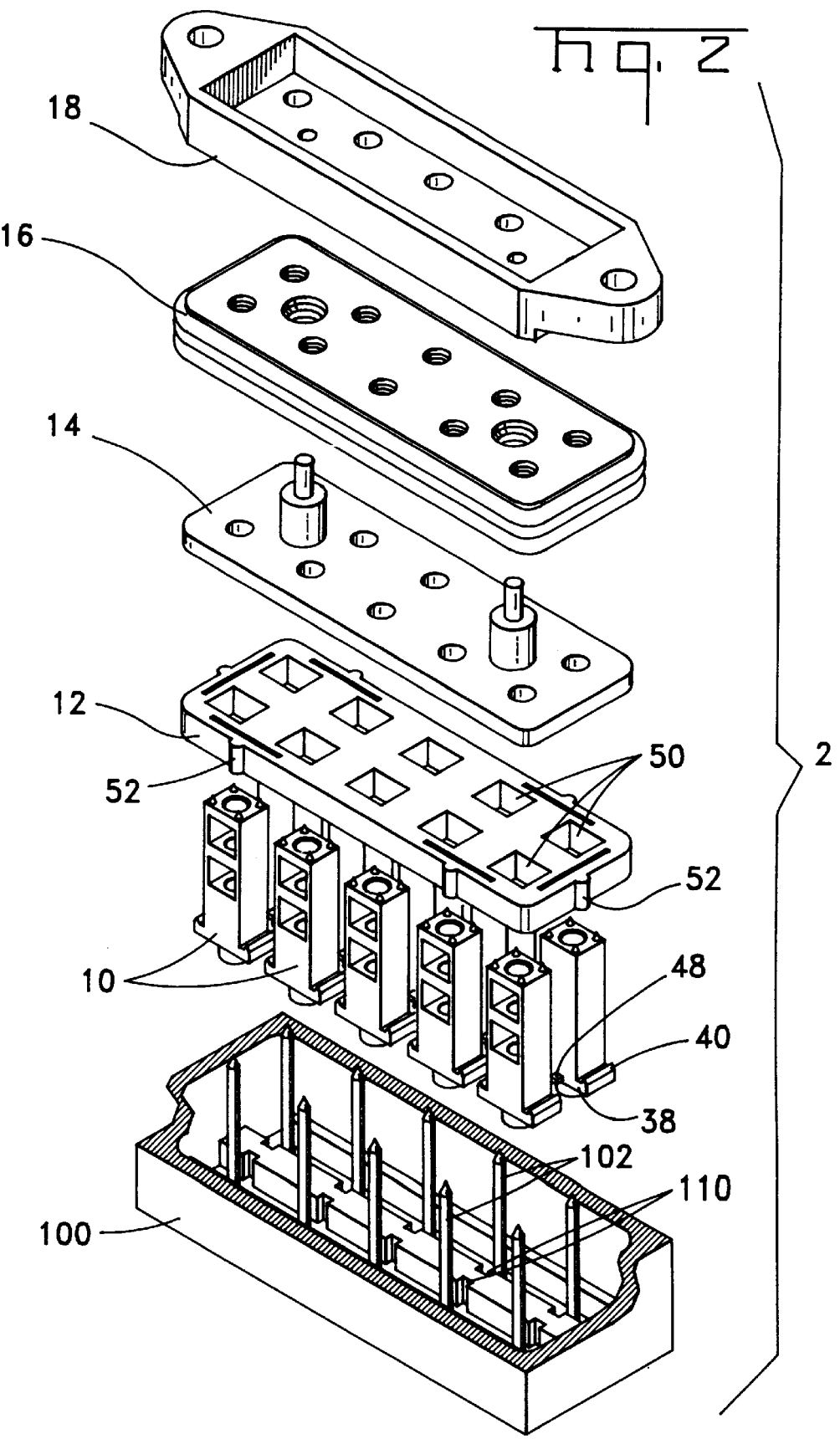

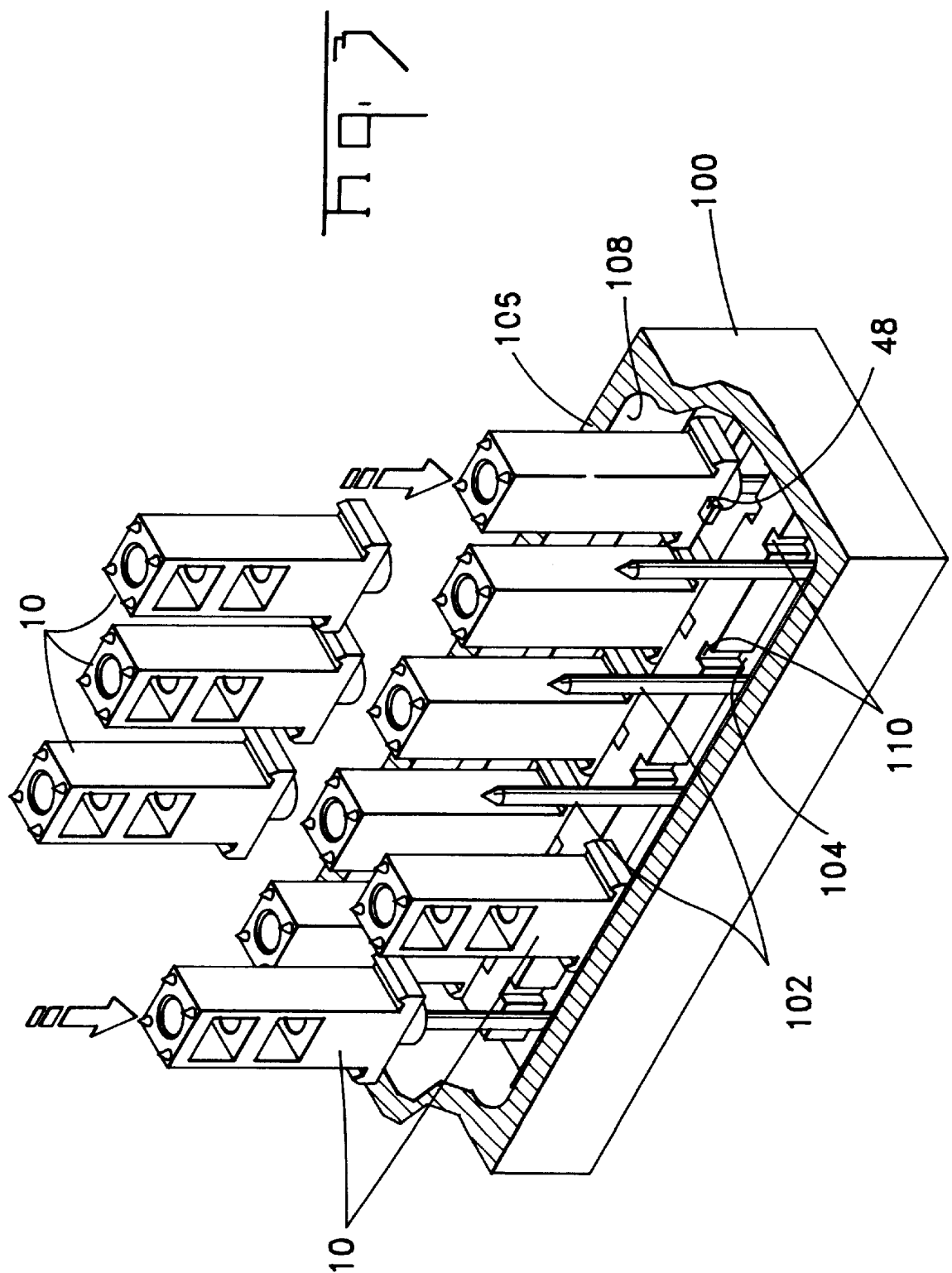

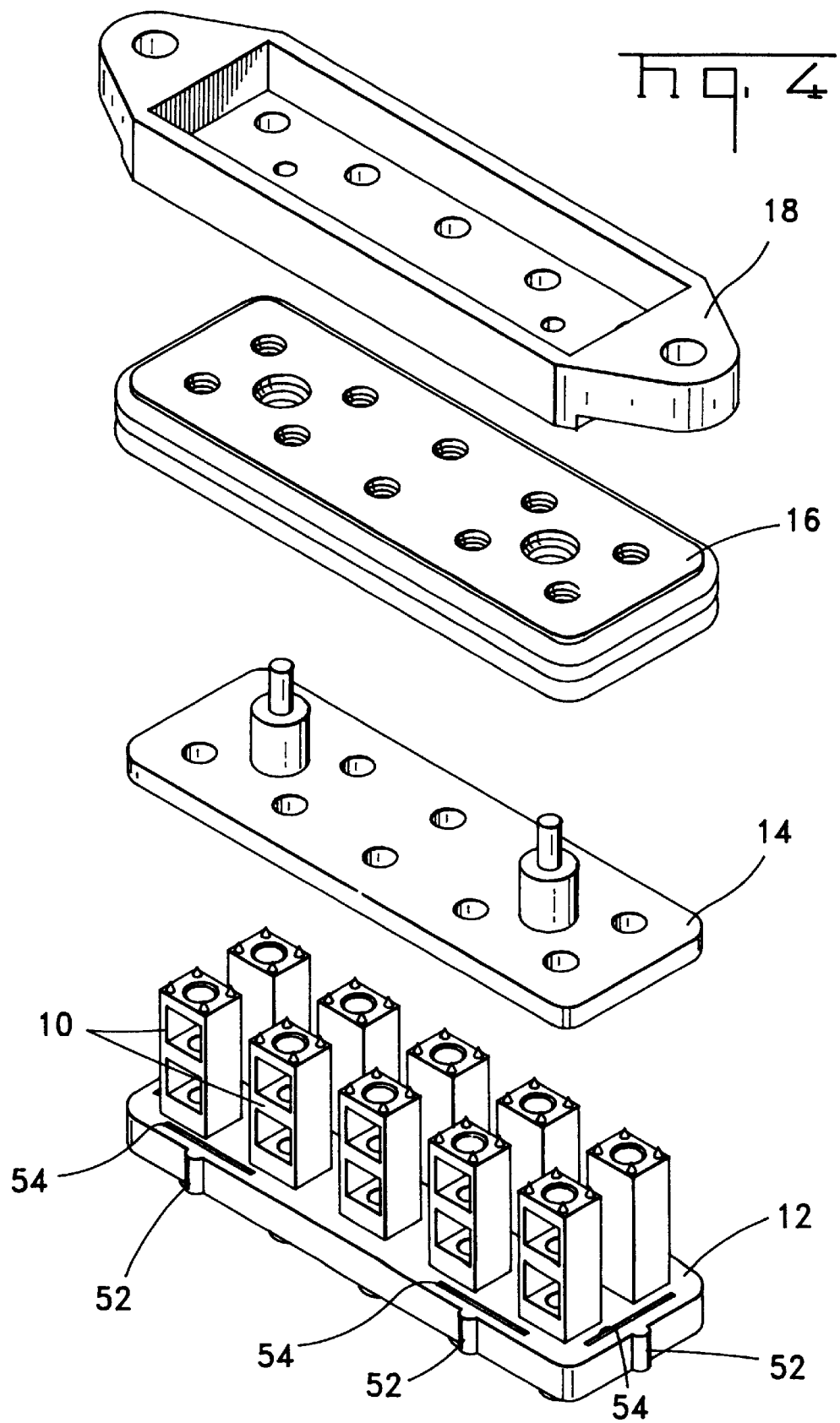

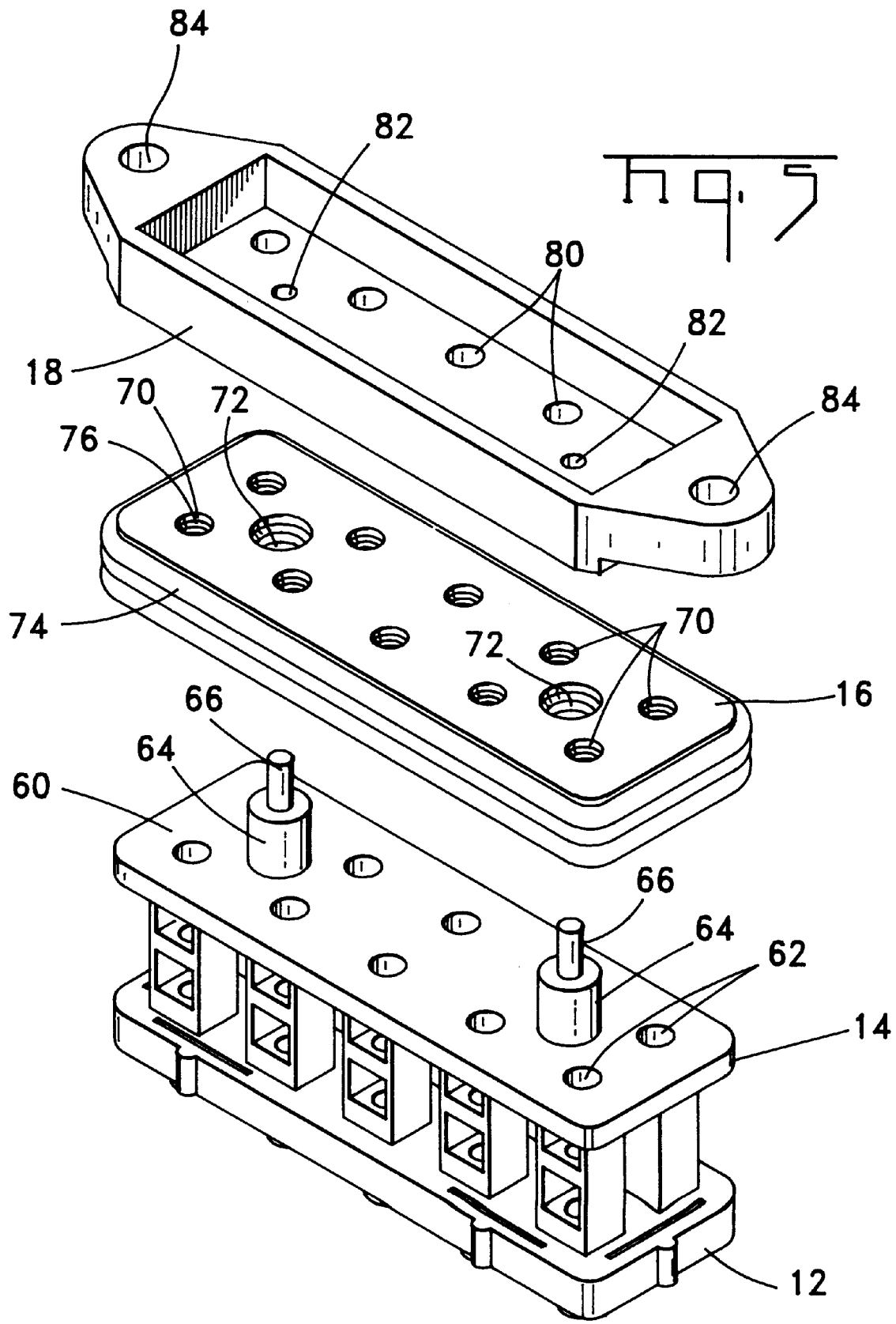

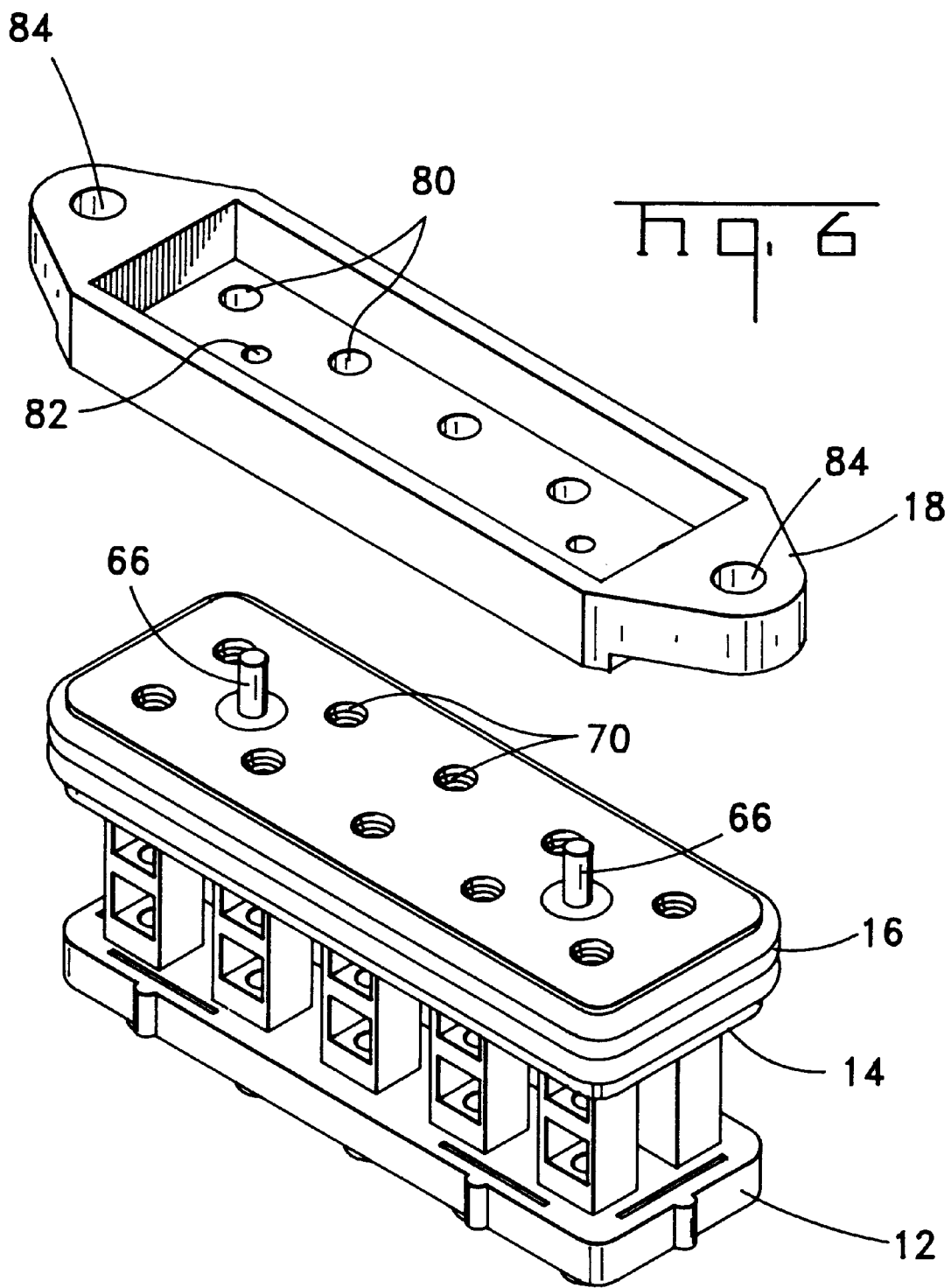

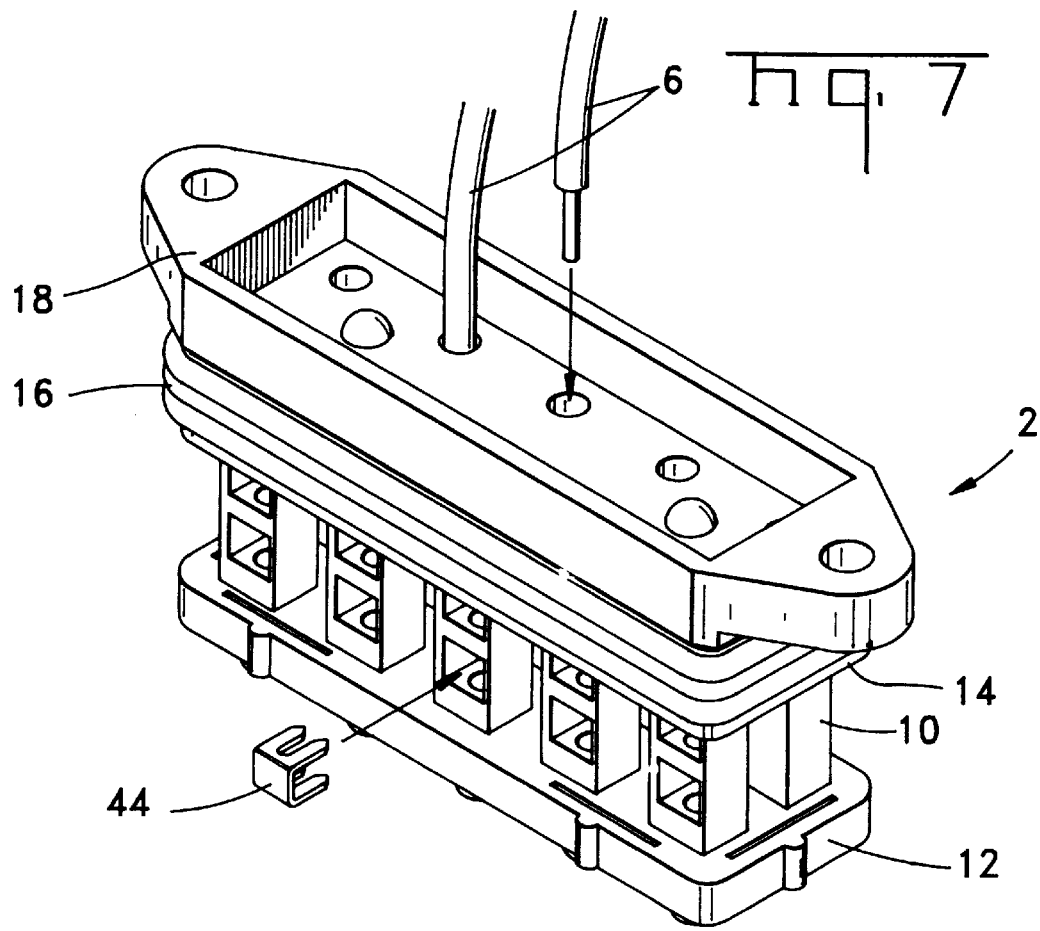
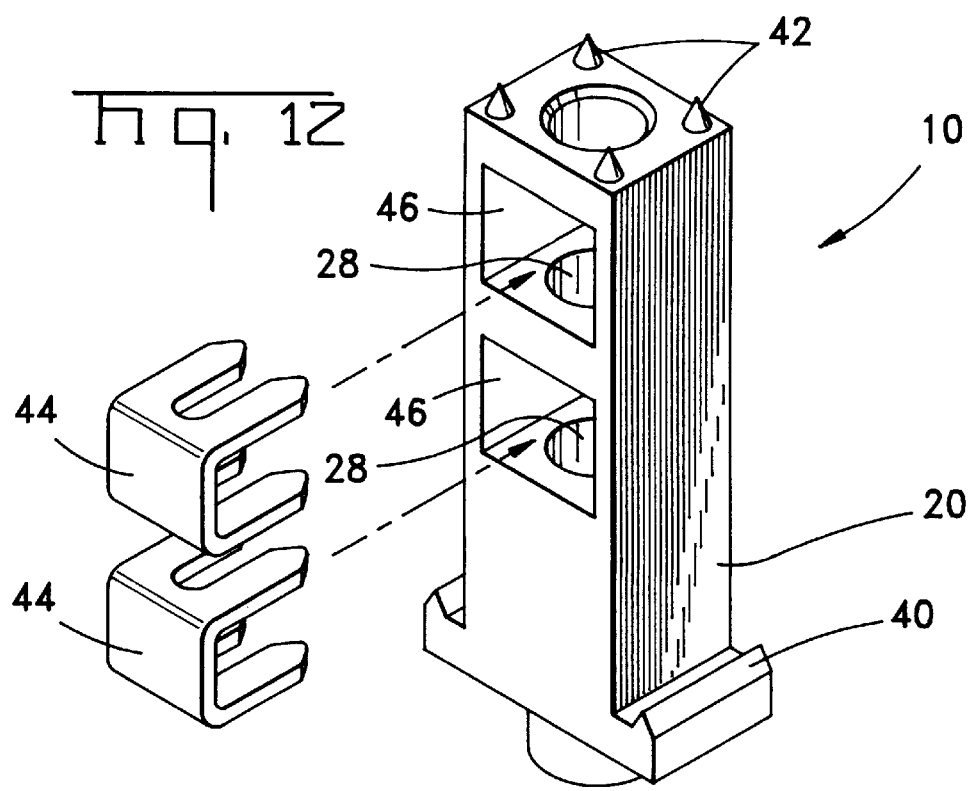

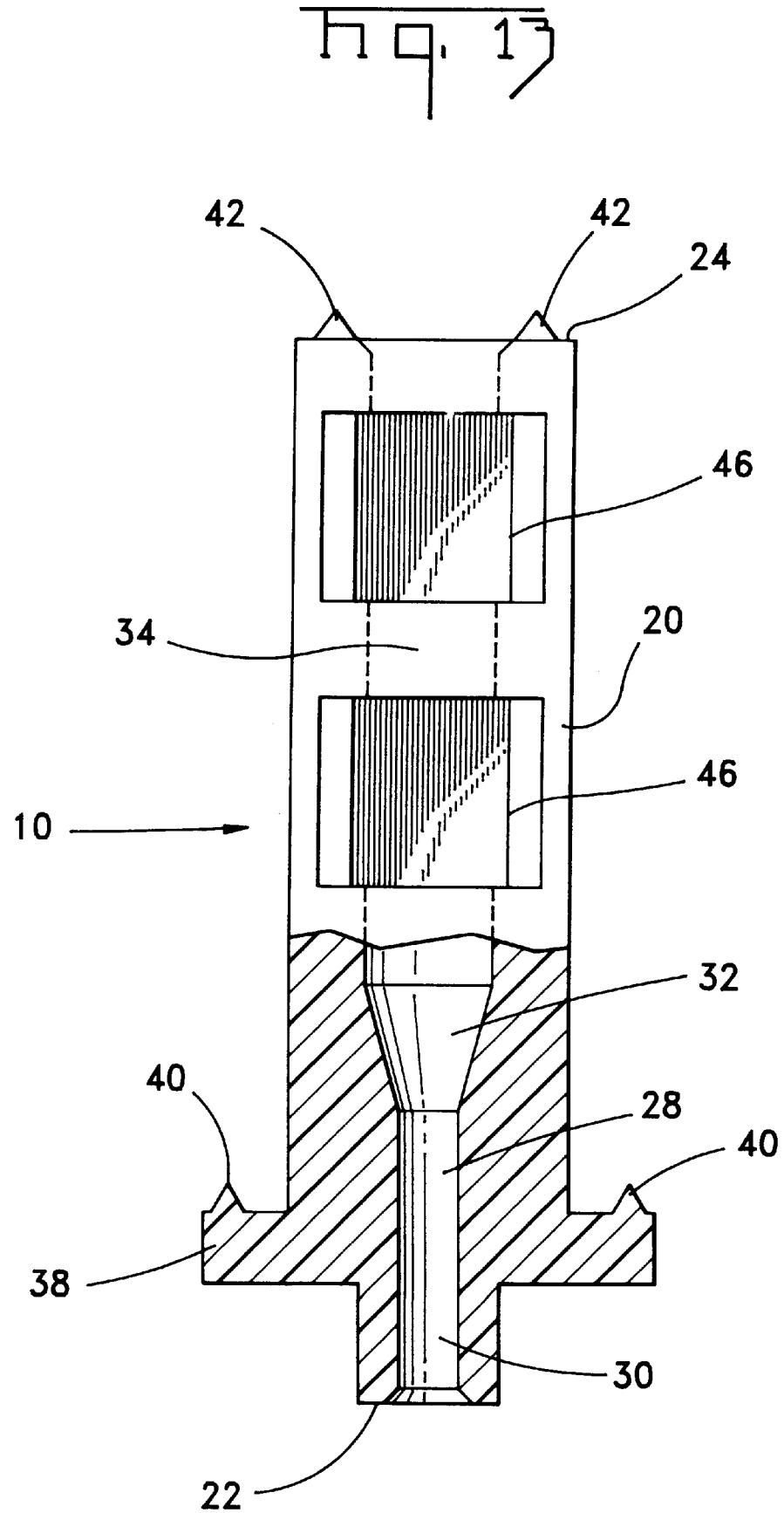

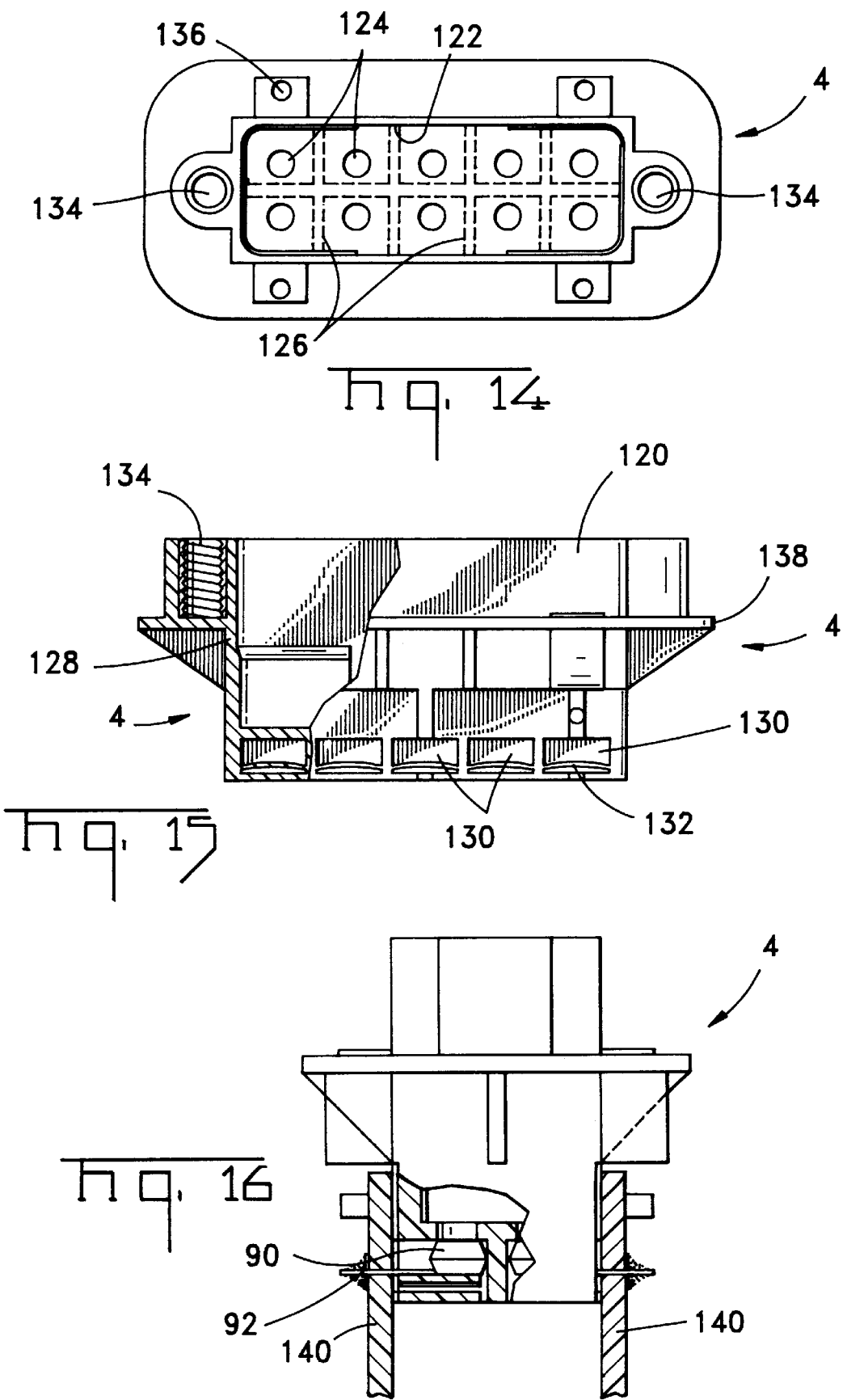

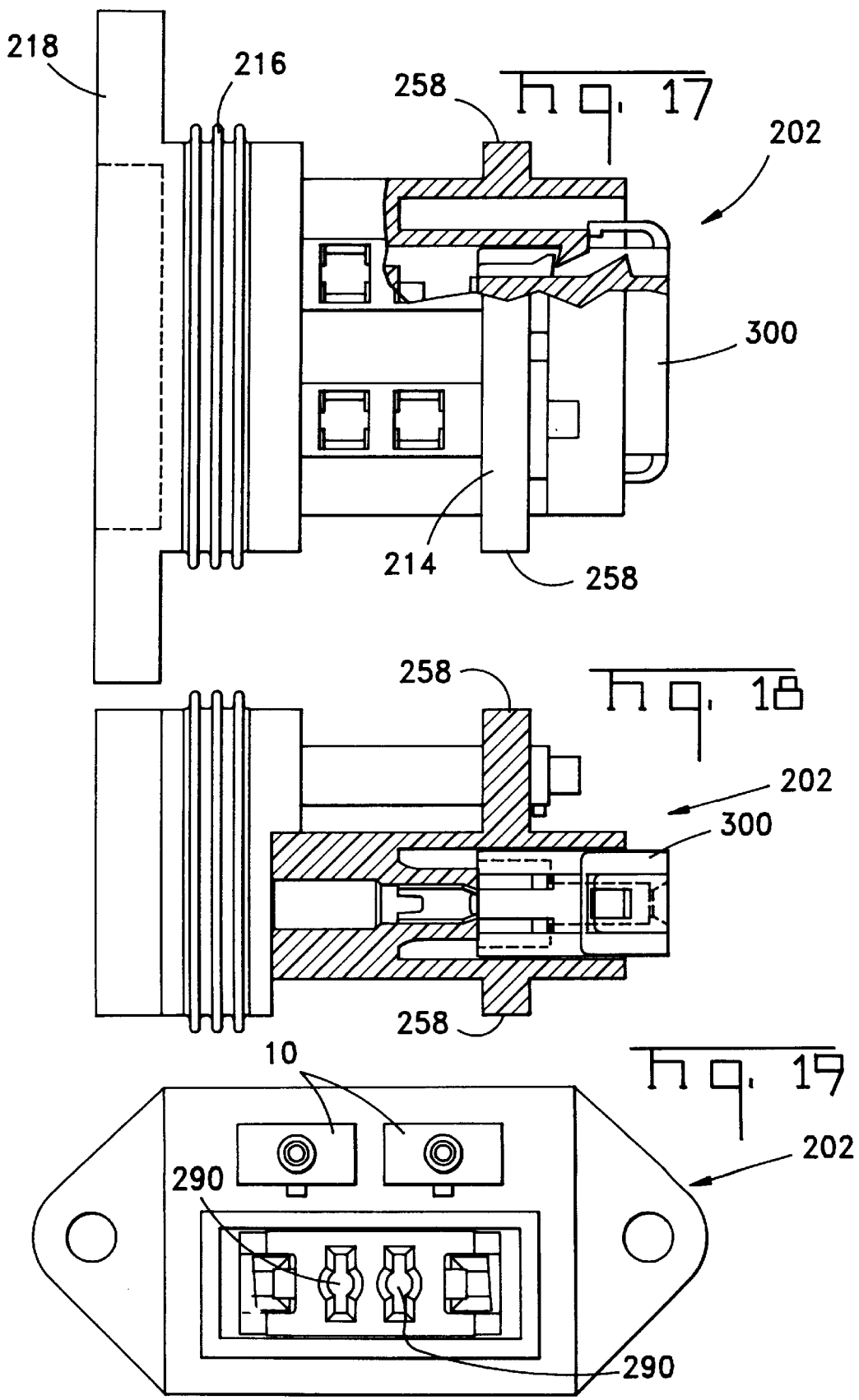

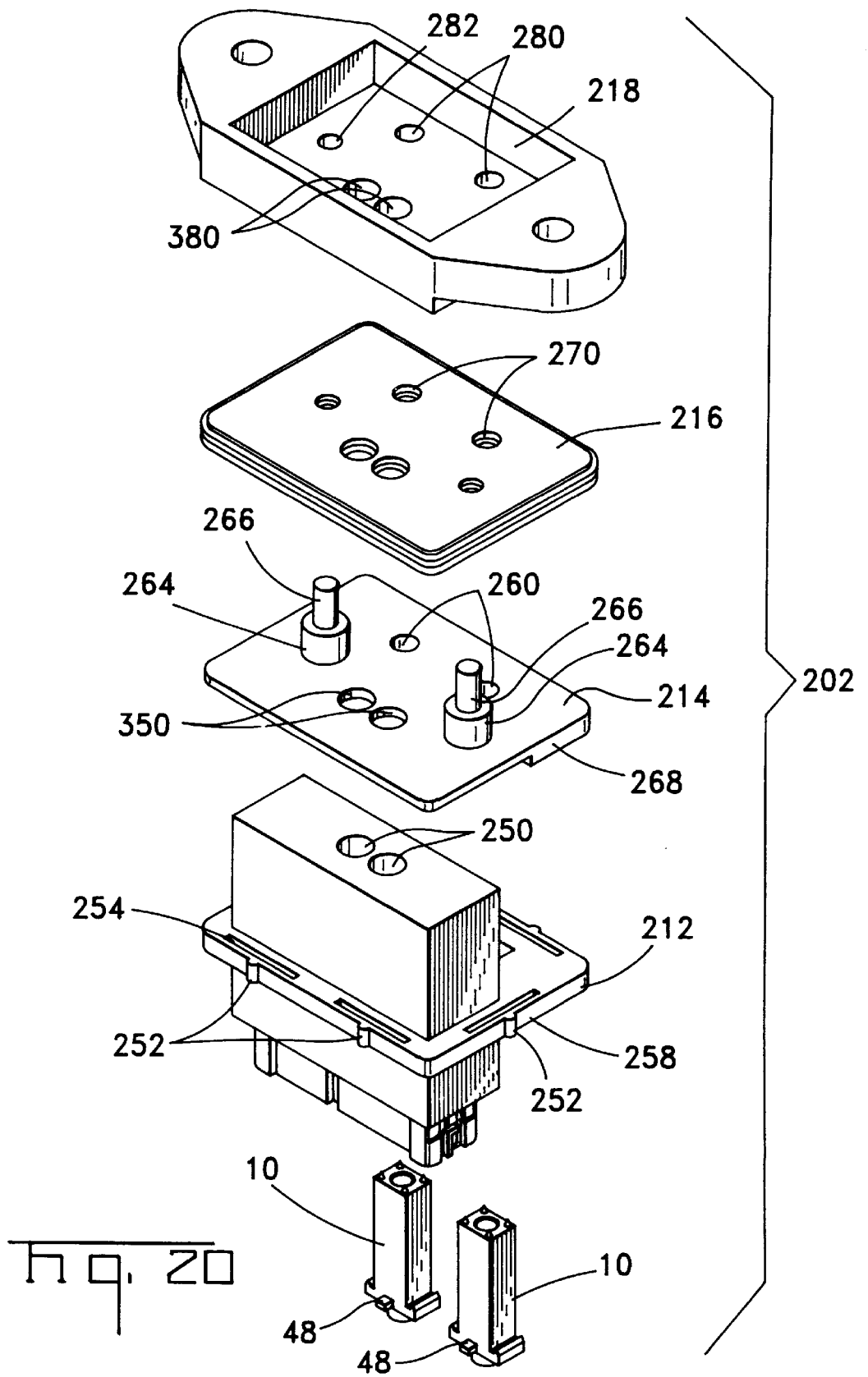

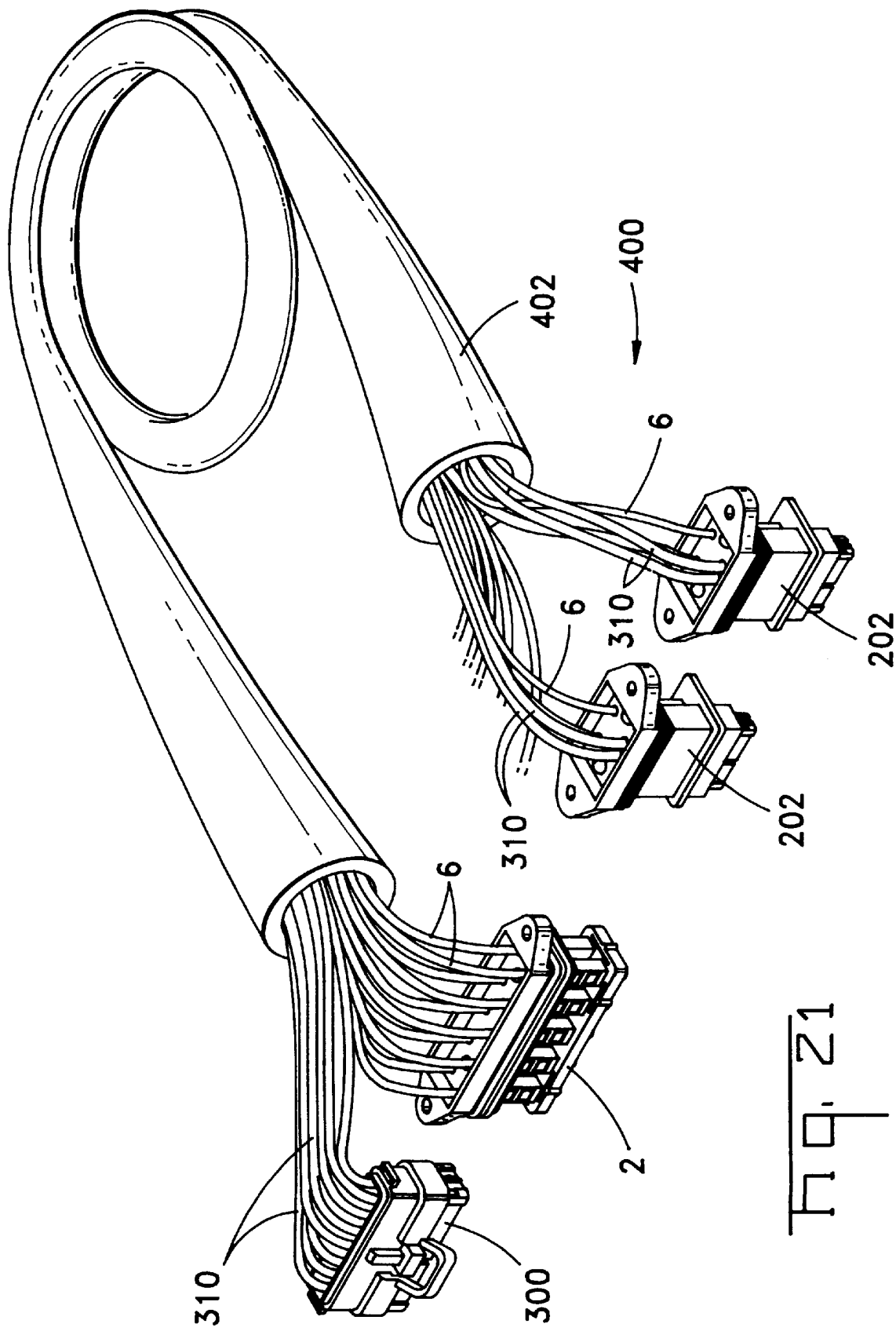

SEALED MULTIPOSITION FIBER OPTIC CONNECTOR

This application is a Divisional of application Ser. No. 08/728,505 filed Oct. 9, 1996, now U.S. Pat. No. 5,671,311, which is a Continuation of application Ser. No. 08/340,101 filed Nov. 15, 1994 now abandoned.

BACKGROUND OF THE INVENTION

1. Field of the Invention

This invention is related to the interconnection of optical fiber cables, both in the form of fiber optic splices and to the interconnection of optical fiber cables to active optoelectronic devices. More specifically this invention is related to the interconnection of multiple fiber optic cables in a single multiposition connector in which each fiber can be precisely aligned with its corresponding optical element. This invention is also related to a device and method for providing sufficiently precise alignment in a multiposition connector which uses molded plastic components exhibiting the tolerances and dimensional irregularities consistent with conventional injection molding. This invention is also related to the interconnection of plastic optical fiber cables.

2. Description of the Prior Art

Fiber optic cables are typically employed in providing communications in a number of applications. One widespread use of these cable is in networking and telecommunications applications. Fiber optic cables are also seen as having advantages for use in signalling applications for products such as automobiles. Residential applications for fiber optics are also under consideration.

However, no matter what the intended application, the interconnection of optical fibers and coupling of active optoelectronic devices to optical fibers still require a degree of precision which is not required for conventional electrical connections. There are a number of fiber optic connectors which have been commonly and successfully employed for connecting one or two optical fibers and dual optical fiber cables are commonly used in networking applications. In general, however, most of these connectors require special tools, the use of epoxy and in some cases polishing operations for each of the fiber interconnections. These special assembly operations are required to prevent excessive losses at the interconnection. Proper alignment of the fibers is one requirement for minimizing such connection losses.

Both glass and plastic fiber optic cables are conventionally used and each is suited for specific applications. In general plastic fiber cable exhibits greater losses than glass fiber cables and precise alignment and a good end finish are necessary for both plastic and glass fibers. One method of terminating plastic fiber optical cables which has been successfully employed is to position the cable in a ferrule after removing a portion of the plastic optical fiber cable jacket from the end of the cable. The ferrule is precisely dimensioned to closely receive the stripped end of the cable and the cable end can be cut, polished or otherwise finished to provide a surface suitable for interconnection with low or at least acceptable losses. One technique for securing the fiber optical cable to the ferrule is to use a retainer which engages the outer jacket to hold the cable in place in the ferrule. One such retainer which has been employed is the use of a slotted plate member which is inserted into a laterally open cavity into the ferrule. The slots in the retainer plate engage the outer jacket of the fiber, but do not engage the underlying optical fiber. The fiber is thus mechanically held in the ferrule and suitable cleaving and finishing operations can be performed after the cable has been secured in the ferrule. A fiber optic connector employing these principles is shown in U.S. Pat. No. 4,986,625.

Although conventional fiber optic connectors are available for satisfactorily terminating low count cables, there are practical considerations which still make these connectors expensive to employ, and expensive to apply, especially where a large number of optical fibers must be terminated in relative small spaces. The individual fiber or low fiber count terminations are also difficult to incorporate in assembly line operations. One option is to incorporate individual fiber optic connectors, ferrules or sleeves into a larger connector bodies and to attach a large number of fibers at once. However, for those applications requiring individual interconnections of two fibers or individual coupling of a single fiber to an active optoelectronic device, precise alignment is still necessary to prevent unacceptable losses.

Although machined multiposition housings can provide such precise alignment, the cost of such machining operations can be prohibitive. For larger scale applications, such as the use of multiposition fiber optic connectors in automobiles, it is especially desirable that lower cost techniques, such as multicavity injection molding be employed. However, the precision attainable with conventional injection molding, is not necessarily compatible with precisely aligned fiber optic interconnection. This is especially true of configurations in which fiber optic ferrules attached to individual optical fibers are positioned in a molded multiposition housing containing a plurality of side by side openings for receiving the ferrules. The stackup of tolerances for multiple side by side openings located in a row is such that the relative spacing of openings at either end may be outside the precise alignment necessary for a suitable low loss optical interconnection. For example, the location of openings in a housing made in one cavity may be significantly different than the location of openings in a housing made in a different cavity.

SUMMARY OF THE INVENTION

A multiposition fiber optic connector for use with a plurality of optical fiber cables, preferably plastic optical cables, provides for precise true position alignment with a plurality of active optoelectronic devices in a mating multiposition header. The connector is constructed using individual fiber optic ferrules which are precisely aligned with respect to each other and to connector mating surface means. To precisely align the ferrules, a molded alignment plate and the ferrules are first positioned in an alignment fixture. The connector has mating surface means located on the peripheral edge of the alignment plate and these mating surface means, which are preferably multiple small protrusions are positioned against the inner wall of the alignment fixture to position the alignment plate. The ferrules are precisely positioned by pins in the alignment fixture. After the alignment plate and the ferrules are precisely positioned, the ferrules are preferably ultrasonically bonded to the alignment plate.

The multiposition fiber optic connector mates with a header which contains active optoelectronic devices, such as transmitters or receivers. These optoelectronic devices are precisely positioned within the header by using conventional optical positioning means and the devices are potted in the header. The header has a shroud which has an inner surface which mates with the mating surface on the alignment plate on the multiposition optical connector. This header mating surface is dimensioned to correspond to the dimensions on the alignment fixture so the optical fibers in the ferrules will be precisely positioned relative to the active optoelectronic devices.

The multiposition optical connector also includes a seal which engages the individual optical fibers and the shroud on the header to maintain sealing integrity between the multiposition connector and the header. The seal is positioned between a cap plate which is ultrasonically bonded to the other ends of the ferrules and a seal retainer which includes mounting ears for receiving a fastener for attaching the multiposition connector to the header.

The multiposition optical connector can be used as part of a harness assembly which can be employed to make optical and electrical connections between a control hub and remote sensors or actuators in a product such as an automobile. This harness includes both fiber optic cables and electrical wires. Separate multiposition optical and multiposition electrical connectors can be used to make connections at the control hub. Hybrid electrical and optical connectors can be used to make connections at the remote locations. These hybrid electrical and optical connectors use the same type ferrules secured to an analogous alignment plate in the same manner to provide for true positioning of the optical fiber interconnections.

Among the objects of this invention are the provision of a multiposition fiber optic connector which precisely aligns the ends of optical fiber cables with a corresponding optical component. Although the preferred embodiments disclose a multiposition connector which mates with a header containing active optoelectronic components, substantially the same configuration can be used for passive fiber optic splices.

Another specific object of this invention is to provide a multiposition fiber optic connector which can use plastic components molded by conventional injection molding. More specifically this invention is intended to be employed in configurations in which multiple fibers are interconnected in rows and in which the precision attainable with injection molding techniques is not sufficient to insure proper alignment of individual fibers.

This invention is also intended to be used in harness assemblies which can be assembled prior to their use in assembly line fabrication of a product, such as an automobile, in which optical communication is employed. The invention is also adapted for use in hybrid optical and electrical application, such as applications in which control communications uses optical signals, but electrical power must be distributed between the same components.

These and other objects are achieved by the preferred embodiments of this invention depicted herein and by analogous and equivalent structures and components which employ the devices and assembly methods described with reference to these preferred embodiments.

BRIEF DESCRIPTION OF THE DRAWINGS

FIG. 1 is an exploded view showing a first embodiment of a multiposition fiber optic connector and a mating header containing an active optoelectronic device in which the header is mounted on a device box.

FIG. 2 is an exploded perspective view showing the major subcomponents of the multiposition fiber optic connector plug of FIG. 1 showing an alignment fixture used to assemble this connector plug.

FIGS. 3–6 are exploded views, taken from the same perspective as FIG. 2, showing successive operations for the assembly of the multiposition fiber optic connector plug.

FIG. 7 is a perspective view showing insertion and attachment of individual fiber optic cables in the multiposition fiber optic connector of FIGS. 1–6.

FIG. 12 is a perspective view of a single fiber optic ferrule used with plastic optical fiber cables and used in the various embodiments of multiposition connectors depicted herein.

FIG. 13 is a side view, shown partially in section of the ferrule shown in FIG. 12.

FIG. 14 is a top view of the header, shown in FIG. 1, which mates with the embodiment of a multiposition fiber optic connector plug shown in FIGS. 1–11. This view shows the mating interface of this header and the shroud defining this mating interface.

FIG. 15 shows a side view of the header shown in FIGS. 1 and 14.

FIG. 16 is an end view, partially in section, of the header shown in FIGS. 1, 15 and 16, showing an active optoelectronic component mounted on a printed circuit board which is part of a device with which optical communication is required.

FIGS. 17–19 are side, end and bottom views respectively of a second embodiment of a hybrid multiposition fiber optic connector which includes both electrical and optical interconnections.

FIG. 20 is an exploded perspective view of the hybrid electrical-optical connector shown in FIGS. 17–19.

FIG. 21 is a perspective view of an electrical-optical harness assembly using the multiposition optical connector of FIG. 1 and a conventional electrical connector attached to one end of fiber optic cables and electric wires at one end of the assembly and showing hybrid electrical-optical connectors of the embodiment of FIGS. 17–20 at the other end of the harness.

DETAILED DESCRIPTION OF THE PREFERRED EMBODIMENTS

Figure 8:
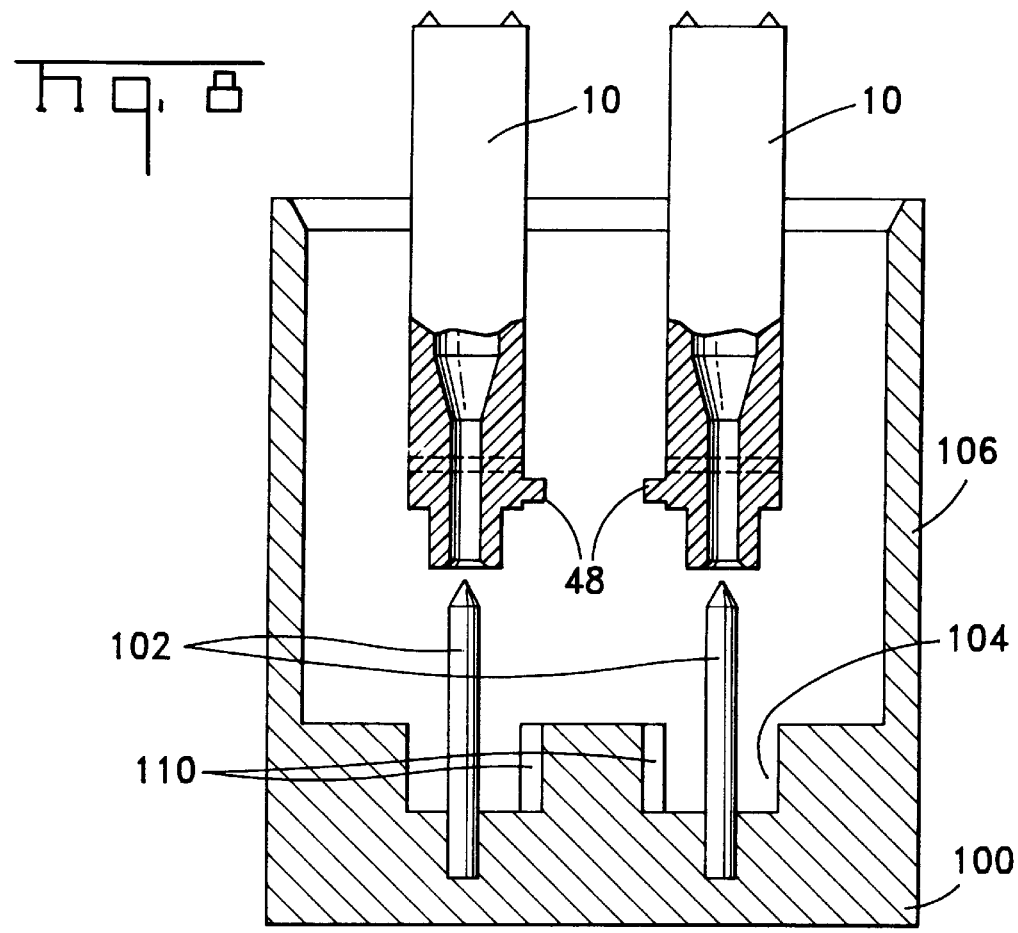
FIGS. 8–10 as lateral section views showing the precise alignment and positioning of the fiber optic ferrules and alignment plate in an assembly fixture and corresponding to the assembly steps also shown in FIGS. 3 and 4.

The preferred embodiments of this invention are specifically adapted for the distribution of signals in a control system used in an assembly such as an automobile, an airplane or other vehicle. However, this invention could also be employed in other applications such as network applications or in buildings. The fiber optic connector or couplings comprising the preferred embodiments are also suitable for use in an assembly in which both optical and electrical signals are distributed in the assembly or network and in applications in which optical signals and electrical power are carried between the same components or subassemblies.

The first embodiment of this invention, shown in FIG. 1, comprises a fiber optic connector or coupling assembly in which ten fiber optic cables are connected by a single fiber optic connector, or a single connector and mating fiber optic header. The second embodiment of this invention, shown in FIGS. 17–20, comprises a hybrid electrical and optical connector which is used to connect both electrical power and optical signals to a component within the system of which it is a part. Both of these embodiments use the same structure and assembly technique to incorporate independent connections for multiple fiber optic cables into the same multiposition fiber optic connector. Both the first and second embodiments of this multiposition fiber optic connector can also be employed as part of a cabling harness of the type shown in FIG. 21. This harness can be used to interconnect various components, such as a control hub to local controllers or sensors in an automobile.

FIG. 1 shows the two matable fiber optic connectors which form the fiber optic coupling of the first embodiment of this invention. A multiposition fiber optic cable connector 2 is matable with a second connector element in the form of a multiposition header 4. In the embodiment depicted herein, the connector 2 provides a single connector interface for ten fiber optic cables 6. In this embodiment, these fiber optic cable 6 comprise single fiber, plastic optical fiber cables. It should be appreciated, however, that a multiposition fiber optic cable of this type could be constructed for use with multifiber cables and with glass fiber cables. Substitution of equivalent fiber optic ferrule connectors would be required for termination of fibers other than the single fiber plastic cable described herein.

The header 4 shown in FIG. 1 is mounted on a bulkhead or cover 8 of component, such as a control hub, which would be one part of the assembly or system with which these connectors are employed. The electronic components which would be included in this device do not comprise an essential element of this invention. As will be subsequently described in more detail, header 4 includes a plurality of active optoelectric devices 90, and the signals transmitted or received by these optoelectrical devices are carried by the optical fiber cables 6 attached to the multiposition fiber optic connector 2. Each of these optoelectric devices operates independently of the others and therefore the signals carried by the individual cables 6 is independent of the other signals. Therefore precise alignment is necessary between each of these cables 6 and its corresponding optoelectric device 90. The multiposition connector 2 and the header 4 must establish and maintain this precise alignment. The three possible types of physical misalignment are end separation, angular misalignment and lateral misalignment.

The major subcomponents of the multiposition connector 2 are shown in the exploded view of FIG. 2. Fiber optic ferrules 10 are of the type employed to establish an electrical connection for plastic, single-fiber, optical cables. Connectors of this general type are described in U.S. Pat. No. 4,986,625. Differences between these ferrules 10 and those described in that patent will be subsequently discussed in more detail. Ten individual ferrules 10 are employed in the embodiment of this invention shown in FIG. 2. Molded plastic alignment plate 12 provides for precise alignment of the individual ferrules 10. This connector also includes a cap plate 14 which like the alignment plate 12 will be attached or secured to each of the ferrules 10 in the completed connector assembly 2. A seal 16 which establishes sealing integrity around the periphery of the multiposition fiber optic connector 2 and around the individual fiber optic cables 6 is shown between the cap plate 14 and a seal retainer 18. Conventional fasteners in the form of screws 98 are also shown in FIG. 1. These fasteners 98 are used to attach the multiposition fiber optic connector 2 to the header 4. As will be subsequently discussed these fasteners 98 are not used as part of the assembly of the major subcomponents of connector 2.

The assembly of multiposition fiber optic connector 2 will be described with reference to FIGS. 3–11. Many of the specific details of the major subcomponents will be discussed with reference to assembly of the connector 2. An assembly or alignment fixture 100 is used to establish the precise alignment of the ferrules 10 which is necessary for proper alignment with the optoelectrical devices housed in the header 4. This assembly fixture 100 includes a plurality of precisely machined pins 102. These pins extend upwardly from the assembly fixture floor 104. Four walls 106 extend upwardly from the floor 104. The front and side walls 106 are broken away in FIG. 3 to reveal the interior of the fixture 100. These four walls are shown in the section views of FIGS. 8–11. The inner periphery 108 of these sidewalls are also precisely machined. These walls comprise reference surfaces for the assembly of the connector 2. The pins 102 are precisely positioned with reference to each other and each of these pins are also precisely positioned with reference to the inner periphery 108 of sidewalls 106. The precise positioning of these pins relative to this reference surface is used to precisely position the individual ferrules 10 which in turn will precisely position the ends of the optical fiber cables 6 which will be individually positioned in these ferrules.

The vertical orientation of the pins 102 relative to the floor 104 of the alignment fixture must also be precisely maintained, since the verticality of the pins will be relied upon to maintain the angular orientation of the ferrules 10 and the fiber optic cables 6. The alignment fixture 100 also includes a plurality of notches 110 positioned on a raised section of the floor 104. These notches 110 are located between the two rows of alignment pins 102 and a single notch 110 is positioned next to each of the pins. These notches 110 are used to orient the ferrules 10 for subsequent attachment of the optical fiber 6 to the ferrules 10. Since this orientation is only needed to facilitate attachment of the cables to the ferrules, the alignment and positioning of the notches 110 relative to the pins 102 need not be as precise as the actual positioning of the pins 102 to the reference surfaces 108 or to each other. The tolerances which must be maintained to provide the precise alignment and positioning referred to with reference to the alignment fixture are within the range which can be achieved for a precisely machined metal fixture. One of ordinary skill can then translate the tolerances required for the fiber optic interface into the precision which must be maintained for the fabrication of this fixture.

The first step in the fabrication of the multiposition fiber optic connector 2 is to position the ferrules 10 on the pins 102 in the alignment fixture 100. As shown in more detail in FIGS. 12 and 13 each ferrule 10 has a bore 28 extending between a forward end 22 and a rearward ferrule end 24. The forward section 30 of bore 28 is precisely molded to receive a single fiber plastic optical cable 6. The ferrules 10 are inserted into the alignment fixture 100 with the alignment pins 102 extending upwardly through the forward bore section 30. It is the fit between the alignment pins 102 and the forward bore section 30 which precisely position each ferrule in the alignment fixture. Orientation of each ferrule 10 is maintained by the ferrule alignment pin 48, located on the exterior of the ferrule, which fits within its corresponding notch 110 when the ferrule 10 is properly positioned in the alignment fixture 100. See FIG. 3.

Figure 9:
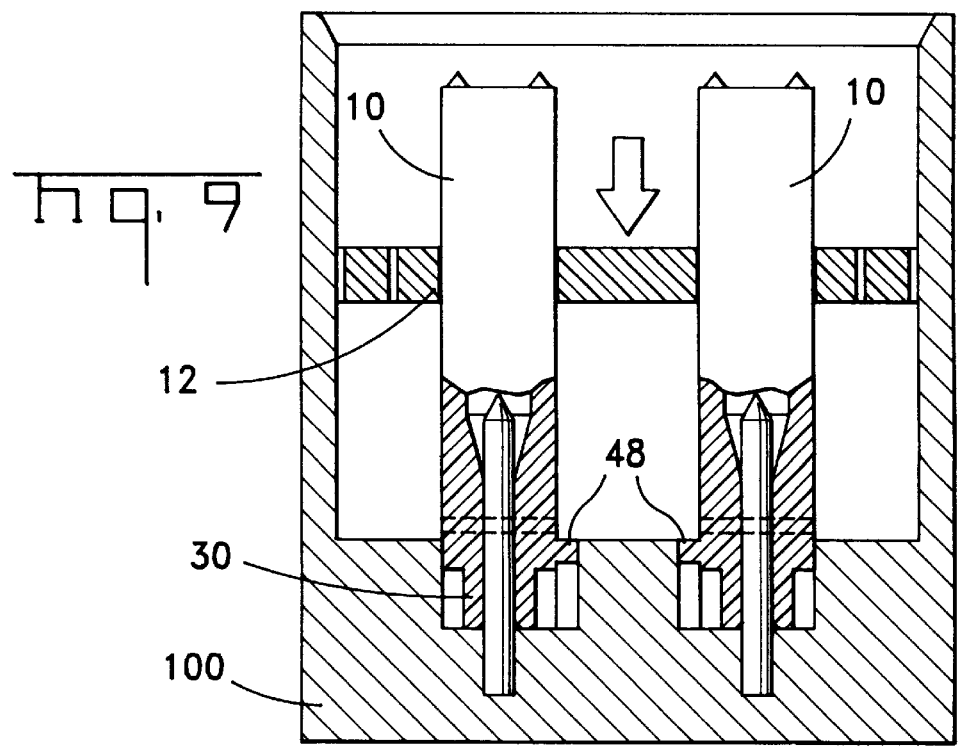
Figure 10:
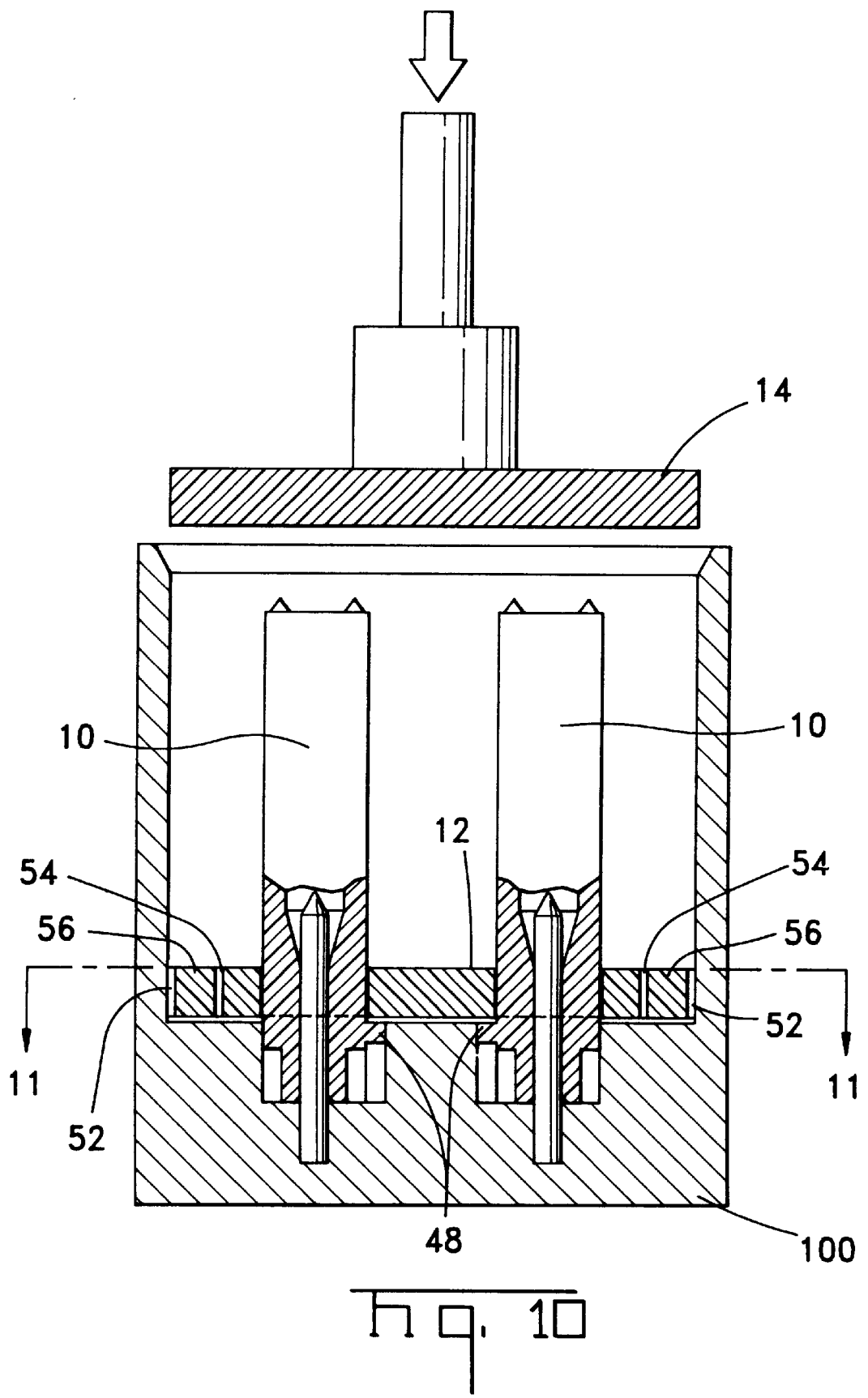
Figure 11:
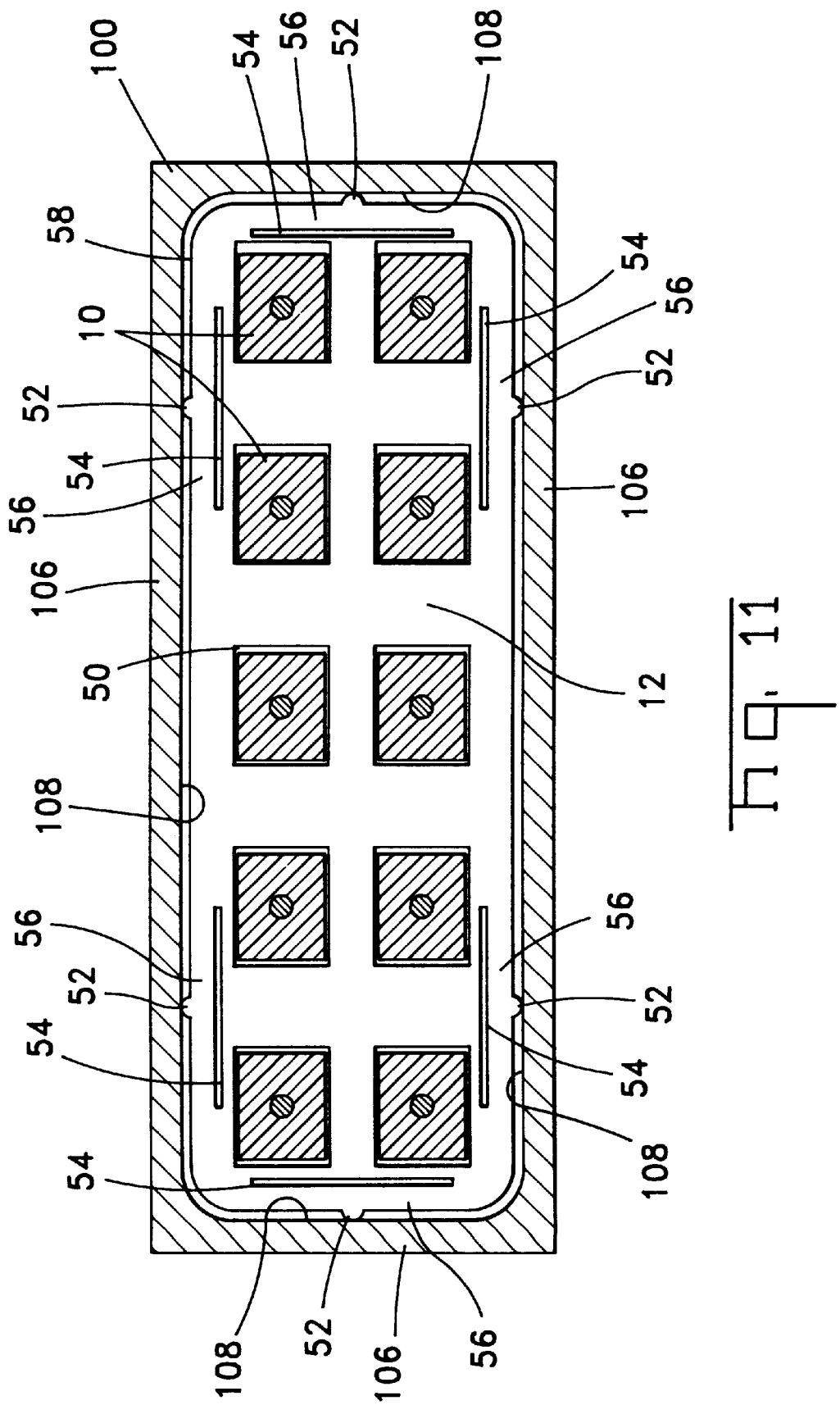
FIG. 11 is a sectional view, taken along section lines 11—11 in FIG. 10, showing the precise positioning of the peripheral mating surface on an alignment plate relative to an interior peripheral surface on an assembly fixture.

The next step in the fabrication of the multiposition fiber optic connector 2 is shown in FIGS. 4 and 9–11. After each of the ferrules 10 are properly positioned in the alignment fixture 100, the alignment plate 12 is inserted into the alignment fixture 100. Although the alignment fixture 100 has been omitted from FIG. 4 to more clearly show the orientation of the connector subcomponents, the initial positioning of the alignment plate 12 relative to the array of ferrules 10 occurs in the alignment fixture. FIGS. 9–11 show positioning of the alignment plate 12 relative to the ferrules 10 by the alignment fixture 100. The alignment plate 12 is an injection molded plastic plate which is generally rectangular. Although referred to as an alignment plate and embodied as a flat rectangular member in the multiposition connector 2, it should be understood that this alignment plate need not be a relatively simple flat plate. In other embodiments a more complex shape may be employed. A relatively more complicated "alignment plate" is shown in the embodiment of FIGS. 17–20. Alignment plate 12 has a plurality of rectangular openings 50 extending between the alignment plate top and bottom surfaces. These ten openings are large enough to each receive one of the ferrules 10. Although these openings 50 are of the same general shape as the exterior of the ferrules 10, the ferrules 10 are only generally, and not precisely, aligned or positioned relative to these openings 50. Standard injection molding cannot be used to maintain sufficiently accurate positioning of each of the openings in an array such as used herein. Normally a center to center tolerance of 0.005 inches between adjacent holes can be maintained. This tolerance and the resulting tolerance stackup for an array of holes does not permit these openings 50 to be used to provide sufficiently accurate positioning of all of the ferrules 10 in the multiposition connector 2. Thus the ferrules are generally aligned, but not precisely aligned, with the openings 50. The effect of this tolerance stackup is illustrated in FIG. 11. The amount of misalignment has been exaggerated in FIG. 11 for illustrative purposes only. This dimensional tolerance would not be visible on the scale of the components shown in FIG. 11, but the illustrated misalignment or general as opposed to precise alignment between the holes 50 and the true position required for the ferrules is significant for the application discussed herein.

The alignment plate 12 has a peripheral surface 58. This peripheral surface has a number of small protrusions 52 extending outwardly, which comprise mating surface means. The size of these protrusions has been exaggerated in these drawings for clarity. In fact the height of these protrusions is on the order of 0.012 inches (0.005 cm.) Six of these protrusions 52 are located on the mating surface 58 of alignment plate 12, one of each of the opposite ends and two along each side. Slots 54 extending through the alignment plate 12 are located adjacent each protrusion 52. These slots 54 extend beyond the corresponding protrusion to form flexible sections 56 between the slots 54 and the portions of peripheral surface 58 immediately adjacent each of these protrusions. Each of these protrusions engage the peripheral reference surface 108 of the alignment fixture 100. This is best shown in FIG. 11. These protrusions 52 are now precisely positioned relative to the reference surface 108. Deflection of the flexible sections 56 allows for any slight dimensional mismatch of the molded alignment plate 12. The entire molded plate 12 is therefore precisely positioned relative to the reference surface 108. Since the ferrules 10 were previously precisely positioned relative to the reference surface 108, the ferrules are not precisely positioned relative to the alignment plate 12 as a whole. Note that this does not require each of the ferrules 10 to be precisely positioned within each of the openings 50. These holes are large enough to permit the ferrules to maintain their precise alignment relative to each other and relative to the reference surface 108, and therefore relative to mating surface means 52.

The next step in the fabrication of multiposition fiber optic connector 2 is to attach, bond or secure the individual ferrules 10 to the alignment plate 12 while the ferrules and the alignment plate are held in precise alignment by the fixture 100. The preferred method of attaching the ferrules to the alignment plate is to ultrasonically bond the ferrules to the alignment plate while they are still in the alignment fixture 100. A suitable ultrasonic horn and fabrication apparatus can be manufactured by one of ordinary skill in the art and is therefore not depicted here. Each of the ferrules 10 has ferrule mounting flanges 38 located adjacent to the ferrule forward end 22. In the preferred embodiment flanges 38 extend from opposite sides of ferrules 10 and each of these ferrules has an integral plastic energy director in the form of a rib 40 protruding upwardly. These energy director ribs 40 are configured in a shape suitable for ultrasonic bonding. The precise shape of these energy director ribs 40 is determined by the ultrasonic bonding operations and is generally well known to those skilled in ultrasonic bonding techniques and equipment. With the ferrules 10 and alignment plate 12 positioned therein, the alignment fixture 100 is placed in an ultrasonic bonding fixture and the plastic in energy director ribs 40 provides the bonding or fusing of the ferrules to the alignment plate. Now the ferrules 10 and the alignment plate 12 are held together, attached, secured, bonded or fused with the ferrules precisely positioned relative to the peripheral mating surface 58. Although ultrasonic bonding has been chosen as the preferred process to attach or secure the ferrules to the alignment plate, it should be understood that other conventional processes could be employed. Adhesives could be used and heat staking is one other possibility.

After the ferrules 10 have been ultrasonically bonded to the alignment plate 12 and in precise alignment relative to its peripheral reference surface 108 of the alignment fixture 100 and therefore relative to the mating surface means or protrusions 52, including protrusions 52, and in precise alignment relative to each other, the ferrules 10 are attached to a cap plate 14 at the rearward end 24 of the ferrules. This step is shown in FIGS. 5 and 10. Cap plate 14 comprises a molded member with a flat plate body 60 having a generally rectangular peripheral edge. The body 60 has a plurality of holes 62 positioned to receive individual fiber optic cables 6. The body 60 also included two spacer pins 64, each with a mounting pin 66, of smaller diameter, extending from its top surface. As shown in FIGS. 5 and 10, the cap plate 14 is positioned in the alignment fixture 100 with the holes 62 in general alignment with the bores 28 of ferrules 10. It should be understood that it is possible to precisely align the cap plate holes relative to the ferrule bores 28 in essentially the same manner as for the precise alignment of the alignment plate 12, but in the preferred embodiments of this invention, such precise alignment is not necessary. As will be subsequently discussed in more detail, the fiber optic cables 6 will extend through the holes 62 and into ferrule bores 28. only sufficient alignment as is necessary to prevent damage to the fiber optic cable 6 and to permit relatively easy insertion of the fiber optic cables 6 into the ferrules 10 is required.

The cap plate 14 is attached to the ferrules 10 by ultrasonic bonding. The ferrules 10 have plastic energy director cones 42 extending upwardly from the rearward end 24. When the cap plate 14 is mounted in the alignment fixture 100, these cones 42 will engage the lower surface of the body 60 of cap plate 14. Again the fixture 100, with the ferrules 10, the alignment plate 12, and the cap plate 14 in position is inserted into a appropriately designed ultrasonic fixture and the cap plate 14 will be ultrasonically bonded to the ferrules 10 at their top end 24. In the preferred method described herein, this ultrasonic bonding step is in addition to and separate from the step in which the alignment plate is ultrasonically bonded to the ferrules. It should be understood that the ferrules could be bonded to the alignment plate 12 and to the cap plate 14 in one ultrasonic bonding operation. Such a single bonding step could however result in the production of a greater number of defective parts. It should also be understood that other conventional bonding or securing methods, such as heat staking or the use of adhesives could also be employed, again with the understanding that the reliability of these other bonding or securing methods could be less than that offered by ultrasonic bonding.

FIG. 6 shows the next step in the assembly of multiposition fiber optic connector 2. Seal 16 is mounted on the top of cap plate 14 with seal holes 70 in general alignment with cap plate holes 62 and the ferrule bores 28. This step does not require the use of an alignment fixture. Seal mounting holes 72 are dimensioned to engage the exterior of the cap plate spacer pins 64 to maintain sealing integrity around these pins. Ribs 74 are located around the periphery of the seal 16 in position to engage a mating connector to provide sealing integrity around the periphery of multiposition fiber optic connector 2. The seal holes 70 have sealing ribs 76 facing inwardly to engage the exterior of fiber optic cables 6 inserted through these holes to maintain sealing integrity around the individual fiber optic cables 6. After the seal 16 has been positioned as shown in FIG. 6, a seal retainer 18 is attached at the top of seal 16 to complete the assembly of the multiposition fiber optic connector 2. Seal retainer 18 has holes 80 located to receive fiber optic cables 6 and two seal retainer mounting holes 82 in alignment with cap plate mounting pins 66. The seal retainer is attached to the cap plate 14 by radially deforming the tops of mounting pins 66 by ultrasonically bonding or similar conventional securing operation. The multiposition fiber optic connector 2 is now complete.

As shown in FIG. 7, individual plastic fiber optic cables 6 are mounted in multiposition fiber optic connector 2 by inserting each fiber optic cable 6 through the aligned holes 62, 70 and 80 and into the bore 28 of an individual ferrule 10. The outer jacket on the end of the plastic fiber is first stripped to expose the fiber. The fiber is then inserted into the ferrule with the end of the fiber being located at the ferrule forward end 22. The ferrule bore forward section 30 is dimensioned to closely engage the exterior of the plastic optical fiber and to precisely position the fiber relative to the ferrule 10. At this point two cable retainers 44 are inserted laterally into ferrule cavities 46 to secure the fiber in the ferrule 10. These retainers have slots which partially penetrate the outer jacket of the fiber to mechanically secure the fiber in its respective ferrule. A ferrule of this type is disclosed in U.S. Pat. No. 4,986,625. The plurality of ferrules 10 are all positioned so that all cavities 46 face outward and are accessible. The engagement of the pins 48 with the alignment fixture notches 110 assures this alignment. The retainers can be individually inserted, or both retainers can be simultaneously inserted into the same ferrule, or multiples fibers can be simultaneously inserted into multiple ferrules. With the fibers positioned in their corresponding ferrules, the forward ends of each fiber is cleaved and then the front surfaces of the fibers are melted back to a smooth precise finish suitable for low loss transmission of optical signals.

Multiposition fiber optic connectors such as connector 2 can be configured to mate with each other to form a fiber optic splice, but the preferred embodiment of this invention employ a configuration in which the multiposition fiber optic connector 2 is mated with a header 4 in which a plurality of active optoelectronic devices 90, such as emitters or detectors, are located. The active optoelectronic devices 90 are precisely positioned within the header using conventional optical alignment techniques. Header 4 has an integrally molded plastic body 128 from which a shroud 120 extends to define an internal mating surface 122. This mating surface is defined by the inside of the four walls which form the mating shroud 120. The dimensions of the lower section of this mating surface conform to the dimensions of the internal mating surface 108 of the alignment fixture 100 within the normal tolerance limits of molding. Since the alignment fixture 100 has precisely positioned the ferrules 10, and therefore fiber optic cables to be positioned in these ferrules, relative to the surface 108 of the alignment fixture 100, these ferrules and cables will be precisely positioned relative to the header mating surface 122, because the interference fit of the alignment plate protrusions 52 in the alignment fixture 100 will be duplicated in the header shroud 120, so that the fibers will be precisely located relative to the optoelectronic devices 90 precisely positioned within the header 4. The optoelectronic devices 90 are positioned, relative to the header mating surface 122, within device cavities 130 which communicate with holes 124 which extend through the bottom of the shroud cavity of the header body 128 within the shroud 120. These holes 124 are nominally aligned with the optoelectronic devices 90 and provide openings for entry of the ferrule tip 22 aligned with the fibers 6 located in the bore 28 of the ferrules 10. The device cavities 130 are also defined by internal walls 126 and flexible lower walls 132. These flexible lower walls 132 temporarily retain the optoelectronic devices 90 within the cavities 130 until the devices 90 are precisely positioned and then permanently potted in position within the cavities 130. Device leads 92 extend from the sides of the header 4 and can be soldered to a printed circuit boards 140 mounted within the component bulkhead 8 with which optical communication is to be established. A gasket between the bulkhead and the header body would maintain a seal.

The header 4 is mounted to a device bulkhead 8 by using four screws received in screwholes 136. Flange 138 is then located flush with the inner surface of the bulkhead 8. The header 4 also has two mounting bores 134 at either end of the shroud 130. The fasteners 98 inserted through seal retainer mounting holes 84. are received in mounting bores 134 on the header 4. Note that it is the engagement between the mating surface means in the form of protrusions 52 and mating surface 122 on the connector 2 and header 4 respectively, not fasteners 98, which aligns the mating connector components and therefore the fibers 6 with devices 90.

A second embodiment of this connector is shown in FIGS. 17–20. This connector 202 is a hybrid electrical and optical connector which provides two electrical connections and two optical connections in the same connector. This hybrid connector 202 includes major subcomponents which correspond to the major subcomponents of the multiposition optical connector 2 in addition to conventional electrical interconnections housed in the same assembly. As shown in FIG. 20, the same ferrules 10 are used in connectors 2 and 202. A molded alignment plate 212 not only corresponds to alignment plate 12, but it also includes an integral housing in which two electrical contacts can be mounted as shown in FIG. 18. The ferrules are precisely positioned relative to the protrusions 252 on the peripheral surface 258 on alignment plate 212. Protrusions 252 correspond to protrusions 52 on connector 2 and slots 254 corresponding to slots 54. The ferrules 10 and alignment plate 212 are positioned within a special alignment fixture (not shown) which corresponds to the alignment fixture 100 used for connector 2. The ferrules are preferably ultrasonically bonded to the alignment plate in precise position. In addition to providing mounting means for the ferrules 10, the alignment plate also includes holes 250 thorough which electrical wires extend and are terminated to electrical terminals which are then loaded from the connector mating end into terminal cavities in the alignment plate. The details of these cavities and the terminal mounted therein are conventional and are therefore not depicted or discussed in detail. Conventional electrical connector configurations, such as the AMPSEAL connector manufactured by AMP Incorporated can be used. AMPSEAL is a trademark of the Whitaker Corporation. Connector 202 also includes a cap plate 214, analogous to cap plate 14, which includes spacers 264 and ultrasonic mounting pins 266. Cap plate 214 also includes holes 350 for the electrical wires in addition to holes 260 for the optical fiber cables 6. A step 268 is located on the lower surface of cap plate 214. This step is necessary to insure proper axial location of the ferrules 10, which are shorter than the conventional electrical terminals used in this connector. The position of the ferrules 10 and the electrical terminal cavities 290 are shown in FIG. 19. Connector 202 also includes a seal 216 and a seal retainer 218 which are analogous to corresponding components in connector 2. Hybrid electrical and optical connector 202 can be mated with a header (not shown) which employs an optical component configuration which corresponds to the configuration of header 4 and which also includes mating electrical connection components.

FIG. 21 shows a representative combination electrical and optical harness assembly 400 which uses both the multiposition optical connector 2 and the hybrid electrical and optical connector 202. This harness 400 includes a number of optical fibers 6 and a number of electrical wires 310 all bundled in the same outer sheath 402. The multiposition optical connector 2 is attached to ten optical fiber cables 6 at one end of the harness assembly. Similarly a multiposition electrical connector 300 is attached to each of the electrical wires 310 at the same end of the harness assembly. The conventional AMPSEAL connector previously referred to is shown here to represent the electrical connector 300.

Two hybrid electrical and optical connectors 202 are shown attached to the opposite ends of optical fibers 6 and electrical wires 310 in the harness assembly 400. Each connector 202 is attached to two optical fibers and to two electrical wires. It should be appreciated that other connectors could be attached at different locations to other wires or optical fibers in this harness assembly. These other connectors could be hybrid electrical and optical connectors 202 or they could be separate conventional electrical connectors and optical connectors.

A harness assembly of the type depicted in FIG. 21 could be employed in an automobile or similar product in which the distribution of both electrical and optical signals is necessary. The multiposition connectors 2 and 300 would be suitable for attachment at a central control location or control hub subassembly. The smaller hybrid electrical and optical connectors could then be connected to remote devices such as sensors or actuators which would respond to control by the control hub. This harness assembly could be fabricated in a separate offline operation and could be used in an assembly line application, the various devices in the automobile or similar product could be quickly interconnected by this harness. Thus reliable optical interconnections, which could not be made as part of the final assembly operation of the automobile, could nevertheless be made without interfering with other assembly operations.

The embodiments depicted herein represent the essential subject matter of the invention disclosed and claimed herein. Equivalent structure and methods are discussed in reference to the preferred embodiments but equivalent structural subcomponents and process steps are to numerous to discuss in detail or to even attempt to catalog. Therefore the claims presented herein are directed not only to the embodiments specifically disclosed but to embodiments including equivalent and analogous structure and methods which would be known to one of ordinary skill in the art.

We claim:

1. A harness assembly for use in distributing optical signals and electrical signals between a first and a second location, the harness comprising:
    a plurality of fiber optic cables;
    a plurality of electrical wires;
    a fiber optic connector including a plurality of ferrules, each ferrule being attached to an individual fiber optic cable;
    an electrical connector including a plurality of electrical terminals, each terminal being attached to an individual wire;
    a plurality of hybrid electrical and optical connectors, each hybrid connector including a housing member and at least one ferrule and at least one electrical terminal, each ferrule being attached to one of the fiber optic cables connected to the fiber optic connector, each terminal being attached to one of the wires connected to the electrical connector, the ferrules and the electrical terminals in the hybrid electrical and optical connectors being positioned side by side in the housing member.

2. The harness assembly of claim 1 wherein the ferrules in the hybrid electrical and optical connector are individually attached to the housing member.

3. The harness assembly of claim 2 wherein the housing member comprises an alignment member having mating surface means, each ferrule being individually bonded to the housing member in precise alignment with the mating surface means.

4. The harness assembly of claim 3 wherein the mating surface means are located on a peripheral surface substantially surrounding the housing member.

5. The harness assembly of claim 4 wherein the housing member includes at least one cavity, each electrical terminal in the hybrid electrical and optical connector being mounted in a corresponding cavity.

\* \* \* \* \*